(12) United States Patent
Svensson

(10) Patent No.: US 9,333,562 B2
(45) Date of Patent: May 10, 2016

(54) CHUCK RELATED ARRANGEMENT AND A METHOD FOR ASSEMBLING SAID ARRANGEMENT

(76) Inventor: Bo Karl Ragnar Svensson, Nybrogatan (SE)

( * ) Notice: Subject to any disclaimer, the term of this patent is extended or adjusted under 35 U.S.C. 154(b) by 300 days.

(21) Appl. No.: 14/234,539

(22) PCT Filed: Jul. 17, 2012

(86) PCT No.: PCT/SE2012/050839
§ 371 (c)(1),
(2), (4) Date: Mar. 21, 2014

(87) PCT Pub. No.: WO2013/015736
PCT Pub. Date: Jan. 31, 2013

(65) Prior Publication Data
US 2014/0191479 A1 Jul. 10, 2014

(30) Foreign Application Priority Data

Jul. 26, 2011 (SE) ........................ 1100565

(51) Int. Cl.
*B23B 31/16* (2006.01)
*B23B 31/12* (2006.01)
*B23B 31/163* (2006.01)

(52) U.S. Cl.
CPC ..... *B23B 31/16279* (2013.01); *B23B 31/16275* (2013.01); *B23B 31/1269* (2013.01); *B23B 31/16008* (2013.01); *B23B 31/16012* (2013.01); *B23B 31/16016* (2013.01); *B23B 2270/16* (2013.01); *Y10T 29/49963* (2015.01); *Y10T 279/1986* (2015.01); *Y10T 279/1993* (2015.01)

(58) Field of Classification Search
CPC .................. B23B 2270/16; B23B 31/16279; B23B 31/1269; B23B 31/16275; B23B 31/16008; B23B 31/16012; B23B 31/16016; Y10T 29/49963; Y10T 279/1993; Y10T 279/1986; B23Q 3/06
See application file for complete search history.

(56) References Cited

U.S. PATENT DOCUMENTS 2,896,958 A * 7/1959 Strauss ............. B23B 31/16275
269/156
2,950,117 A 8/1960 Walmsley
(Continued)

FOREIGN PATENT DOCUMENTS

| GB | 2143163 A | 2/1985 |
|---|---|---|
| WO | 9526248 A1 | 10/1995 |

OTHER PUBLICATIONS

International Search Report, dated Nov. 6, 2012, from corresponding PCT application.

*Primary Examiner* — Eric A Gates
*Assistant Examiner* — Paul M Janeski
(74) *Attorney, Agent, or Firm* — Young & Thomson

(57) ABSTRACT

A chuck-related arrangement having a main portion and chuck jaw portions coordinated with the main portion with associated clamping arrangements, wherein one surface of the main portion is provided with a plurality of tracks adapted to displaceably carry chuck jaw portions. Each one of, and/or a chosen number of, clamping arrangements, are individually to be secured to its element solidly secured to its basic chuck jaw portion exposing a rotational cooperation with an external chuck jaw portion over a central axis of rotation. Two or more of the external chuck jaw portions and their peripheral surfaces are formed as one or more recesses in order to cooperate opposed recesses to form clamping surfaces for a work piece and/or formed as one or more, the recesses intermediately oriented, radially extending elevations, causing cooperative elevations after a rotation to form direct clamping surfaces towards the work piece.

9 Claims, 9 Drawing Sheets

(56) References Cited

U.S. PATENT DOCUMENTS

| | | | |
|---|---|---|---|
| 3,179,430 A | 4/1965 | Zierden | |
| 4,706,973 A * | 11/1987 | Covarrubias | B23B 31/16275 269/266 |
| 4,861,048 A * | 8/1989 | Slater | B23B 31/16275 279/123 |
| 5,542,686 A * | 8/1996 | Revuelta | B23B 31/16275 279/123 |

* cited by examiner

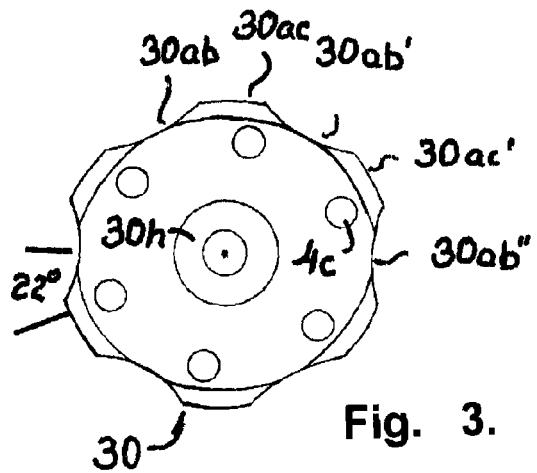
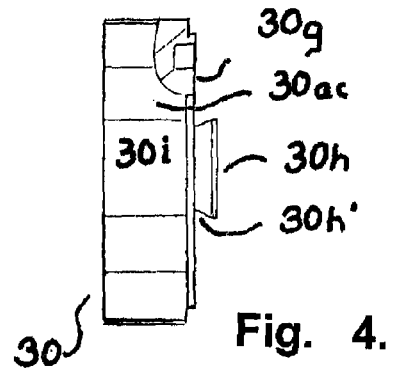
Fig. 3.  Fig. 4.
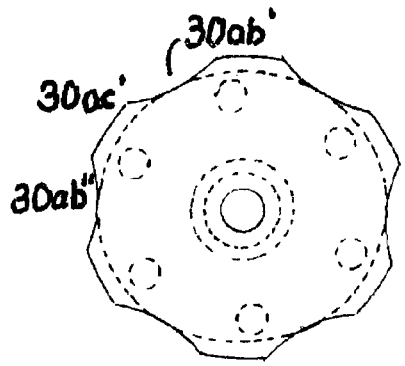
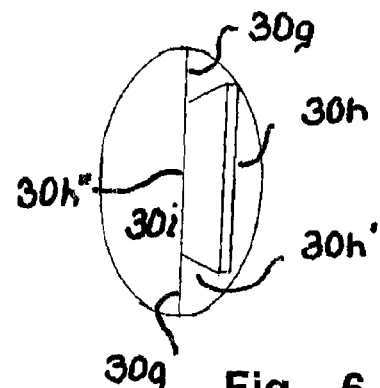
Fig. 5.  Fig. 6.
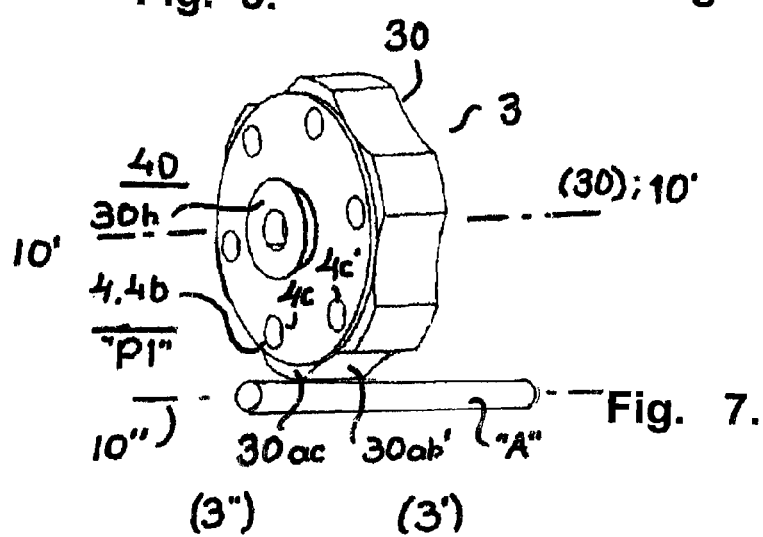
Fig. 7.

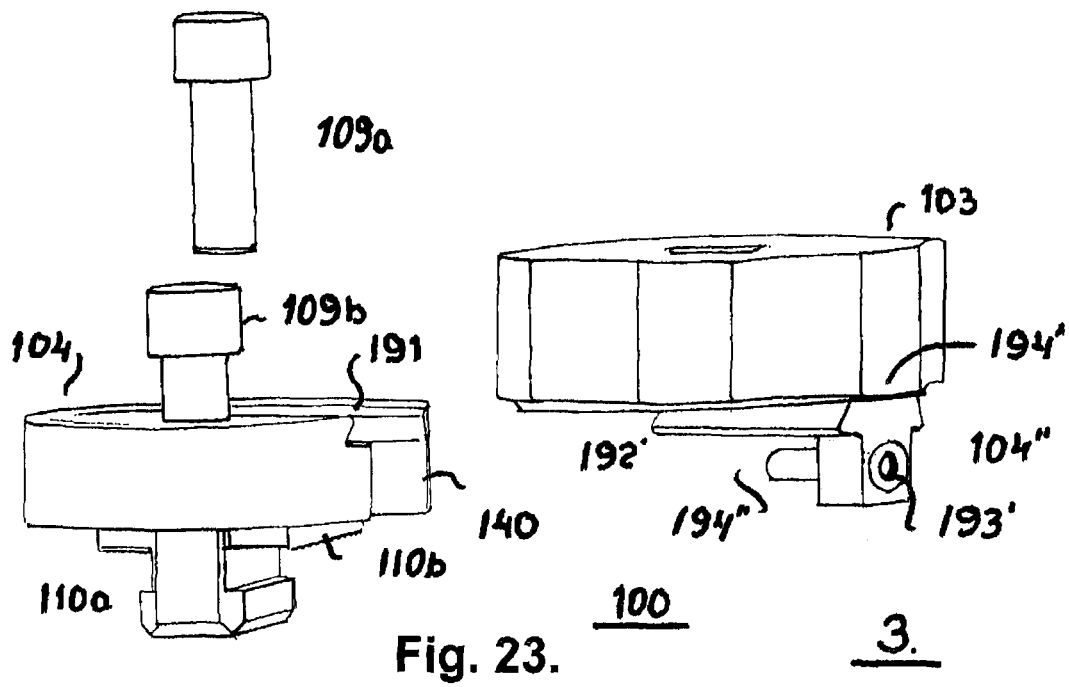
Fig. 23.
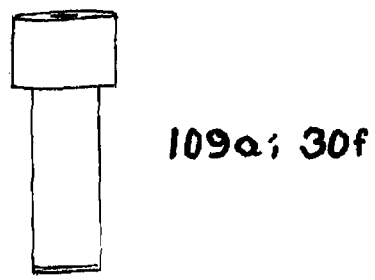
Fig. 24.
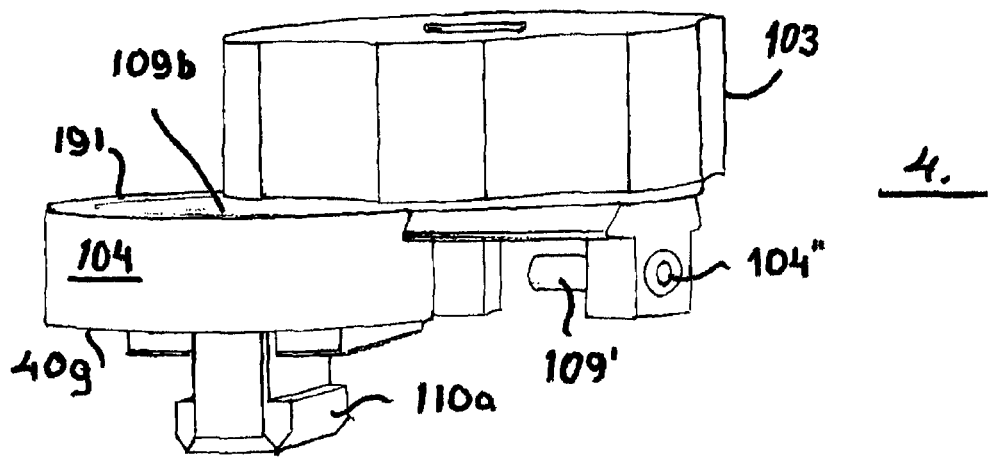

CHUCK RELATED ARRANGEMENT AND A METHOD FOR ASSEMBLING SAID ARRANGEMENT

TECHNICAL FIELD OF THE INVENTION

This invention generally refers to a chuck adapted to be able to offer over a plurality of jaws a securing and a clamping of a work piece and more specifically refers to a chuck-related arrangement.

The present invention also concerns a method for mounting together such a chuck-related arrangement on the basis of its individual parts or portions, having a basic (inner) chuck jaw portion, operable with the main part of the chuck and its means allotted to a T-track nut, an external (outer) or upper chuck jaw portion turnably attached to said basic chuck jaw portion, and two bolted joints or bolt arrangements having an associated stop or locking unit.

Such arrangement is adapted primarily over a clamping action by the chuck clamps, to be able to hold tight and clamp a work piece being cuttingly and/or abrasively processed and having such function, as well as secondly over loosening the chuck clamps being able to loosen the work piece after a finalizing processing.

The invention is based on this arrangement being able to exhibit at least two, in this specific case, cylindrical portions allotted to the chuck and a number of, such as a plurality of, each chuck allotted portion rotatably coordinated to parts allotted to a clamping surface.

One of the external circular surfaces, such as a flat ones, of said main portion, is to be shaped with a plurality of tracks, two or more (usually three), with each one of these tracks being adapted to radially and displaceably support said portions allotted to the chuck, which are disposed radially displaceably in a direction towards and from each other by means (T-track nuts) allotted to the main portion, in order for these chuck-related portions, when they are disposed directly or indirectly in assembled position, to be permitted to hold and/or attach or clamp the work piece intended for processing, and in positions directed away from each other, letting the portions associated with the chuck release such processed work piece from its attaching or clamping position for removing the work piece from the main portion, when the processing of the work piece is completed, and thereafter to create prerequisites for introducing a new unprocessed work piece for being gripped and clamped by means of the mentioned portions allotted to the chuck.

Although it is true that a chuck-related arrangement, in accordance with the present invention, can be applied in an arrangement where the chuck is standing still and having a rotatable cutting steel or the like, it has, however, by the present invention turned out primarily to have its application in a lathe, having a rotatable chuck and having a rotatable chuck-related arrangement, having an axis of rotation or a central axis with regard to a center line allotted to the rotation or a center shaft, radially and/or axially displaceable cutting steel, abrasive disc or the like, for a cutting and/or abrading radial and/or axial processing of the work piece held by the chuck and its chuck pieces.

DEFINITIONS

Some of the terms utilized in this specification are primarily to be construed as follows:

In the following description "basic chuck jaw portion (40)" as a first portion or inner jaw portion refers to a first chuck jaw portion, which in a known manner is mounted to the T-track nut of the chuck or similar for permanently cooperating with a means (10*a*) allotted to the main portion, wherein to said basic chuck jaw portion can be mounted a rotatable, soft or hard, "external chuck jaw portion" or outer chuck jaw portion (clamping portion) as a second portion by means of a dovetail or salmontail shaped track (91), wherein rotational movements of the basic chuck jaw portion and the external chuck jaw portion are to be able to be secured and locked with the assistance of a stop or locking unit, such as a wedge and/or a center bolt.

The term "basic chuck jaw portion (40)" refers to a first portion, which is to be able to be included in a chuck-related arrangement, which over one bolt arrangement is to be in unrotatable cooperation with the chuck (1) over its T-track nut, as a means (10*a*) allotted thereto, for radial displacement along tracks (1*f*, 1*g*, 1*h*), allotted to the chuck.

In the following designate a "soft chuck jaw portion" (30), in the following description, to be subject to a cutting processing in order to directly take the form of an unprocessed work piece ("A"), with its tension surface.

In the following specification a "hard chuck jaw portion" (30) means that it can not be subject to a cutting processing for taking the form of an unprocessed work piece ("A") directly with its tension surface.

In the following specification such terms as a "chuck-related arrangement" ("a") is proposed, and this term refers to an arrangement with a main portion (1*a*) and one or more clamping arrangements (3, 3', 3") allotted to the main portion, each of which is shaped as a basic chuck jaw portion (40, 40', 40") and a rotatable external chuck jaw portion (30, 30', 30") related thereto.

The terms "external chuck jaw portion" or "outer jaw portion" (30, 30', 30") are to be understood to be a portion, in accordance with the indications of the present invention, which is disposed in a rotatable cooperation with its basic chuck jaw portion, fastened to the T-track nut of the chuck, by means of a central rotational shaft ((30)).

A stop unit or locking unit is to be understood a unit related to the external chuck jaw portion (30), which unit in its activated position locks a rotational movement of the external chuck jaw portion relative to the basic chuck jaw portion and in its inactivated position makes such an rotational movement possible.

BACKGROUND OF THE INVENTION

Methods, arrangements and structures relating to the technical field mentioned above and having a function and a structure which fulfill the requirements set up are known earlier in a plurality of different embodiments.

As a first example of the background of technology and the technical field to which the invention refers may be mentioned a chuck-related arrangement, having three chuck jaws, as shown and described in the following with reference to the accompanying FIG. 1.

The structure of this arrangement will be described more specifically in connection with the following, below the text portion "Description of known technology".

Arrangements of a relevant type are based on that the main portion allotted to the chuck is to be coordinated with radially oriented two, (or four) chuck jaws, wherein each one is mutually coordinated with and radially displaceable along, in the main portion shaped, radially oriented tracks and/or individually displaceable along said tracks, alternatively being solidly related to the main portion, as a solid counter-engagement portion.

This displacement movement of the chuck jaws is normally synchronized or coordinated for common motion towards and away from a (horizontal) center axis, allotted to the main portion for holding an unprocessed, such as a cylinder-shaped, work piece or removing and letting go of a work piece after such a processing.

To the earlier standpoint of technology there also belongs a chuck-related arrangement having solely two diametrically oriented chuck jaws (according to FIG. 2) or four (two and two) diametrically oriented chuck jaws, wherein a first-mentioned embodiment, in accordance with FIG. 2, also will be described in the following under the text portion "Description of known technology".

To the earlier standpoint of technology also belongs different means coordinated with the main portion and their allotted means, in the form of T-track nuts, for a radial displacement of each jaw part, and as the existence of these means do not comprise an essential portion of the present invention, these means will solely be noted in the following.

The contents of International Patent Publication WO 95/26248-A1 also belong to the earlier standpoint of technology, wherein is shown and described a chuck-related arrangement (21) adapted for use in a lathe chuck (23), with the arrangement being such that the three chuck jaw portions with associated clamping surfaces, in a free from the chuck and in a dismounted position, being turnably positioned into each of four positions around a common fictionary shaft (41) and cooperating with each of three radial tracks in the chuck.

This arrangement (21) comprises at least three cylindrical units (36), wherein each unit is allotted a lengthwise oriented shaft (41) having an external cylindrical surface (42) and having the surfaces (43, 46) disposed at right angles to the shaft (41).

Each unit (36) is allotted three evenly distributed recesses (51, 52, 53, 54) in the cylindrical surfaces (42) and (43).

Each unit (36) cooperates with a track (27), having a T-track nut, for being able to safely anchor the chuck-related arrangement (21).

This patent publication proposes a chuck-related arrangement which, similar to ordinarily existing chuck jaw parts, requires a long time and is elaborate when a complete jaw-associated unit (36) is to be changed with regard to its setting or shifted to an entirely different unit allotted to chuck jaw parts.

These allotted units (36) can only be mounted one by one as one single unit in the four (4) different positions, which are offered by the set-up track (27) of the chuck.

Each entirely new unit or changed unit requires having two screws (bolt arrangements) loosened and removed entirely, whereafter the complete or whole unit (36) can be displaced as a free and single unit and can be shifted manually to a new position, so as to be tightened again in this new position by means of the earlier loosened two screws.

It should also be noted that for each shifting of unit (36) it is required that said unit (36) is cleaned or cleansed as well as its track (27), with its T-track nut, in the chuck (23) so as thereby to be able to ensure the required security.

Basically this patent publication refers to a chuck-related arrangement (21) which is completely in agreement with known technology but with the difference that here suggests the utilization of cylindrical chuck jaw parts with associated clamping surfaces which, not until being completely loosened and removed, become entirely turnable around their fictive axes (41) of rotation so as in the rotation (turning) enabling the use of four separated available clamping surfaces but where the units (36) are, in the same manner as ordinary chuck jaw parts, attached to the track (27) and its T-track nut with the assistance of two bolts, wherein a first bolt (67) is to be extended through a centrally located hole (62) and a second bolt is to be extended through one of two available external holes (63), exposing a function which differs entirely from the present invention.

It is noted that in known technology the jaws or jaw parts or portions will, in a mounting indicated by the patent publication, always utilize two fastening screws against the T-track nut for a displacement along radial tracks in the chuck.

The embodiment shown and illustrated here of the arrangement with the four partially shown cylindrical clamping surfaces will, in consequence of its purely cylindrically shaped external surface, not be able to enable the attachment or clamping of very small work pieces with their associated small diameters without first a change being carried out of the realization and shape of the jaws for being directly adapted to these small diameters, as cylindrically shaped external surfaces will cause a limitation.

STATEMENT OF THE PRESENT INVENTION

Technical Problem

If consideration is taken to the circumstance that the technical considerations which a person skilled in the relevant technical art will have to carry out in order to offer a solution to one or more occurring technical problems are on one hand initially a necessary insight into the measures and/or the sequence of measures which are to be carried out and on the other hand a necessary choice of the necessary means, in consideration whereof, the following technical problems should be relevant in structuring the present subject of invention.

Considering the earlier standpoint of technology as it has been described above it should therefore be seen as a technical problem to understand the significance of, the advantages related to and/or the technical measures and considerations which will be necessary for in an indicated chuck-related arrangement, having a main portion allotted to the chuck and two or more chuck jaws coordinated with this main portion, such as chuck-allotted portions, wherein one of the flat surfaces of said main portion is to be provided with a number of radial grooves or tracks (two or more), each one adapted to support an individual chuck as a radially displaceably, which means coordinated with the main portion and allotted thereto (T-track nuts) are individually or coordinatedly displaceably positioned in a direction towards and away from each other so as to let these chuck jaws, in their cooperative position, clamp a work piece intended for processing and in an opposing position permit the chuck jaws to let go of a work piece in this manner processed during its clamped or tightened position, for removing from the main portion allotted to the chuck a processed work piece, thereby indicate that each one of the thus coordinated or chosen basic chuck jaw portions is to cooperate with its allotted external or outer chuck jaw portion which in a simple manner is to be adapted to coordinated tightening arrangements.

These coordinated basic chuck jaw portions and external chuck jaw portions, exposing their associated clamping surfaces for the work piece, are adapted to form a real cross sectional surface or tightening surface or one of a plurality of available latent cross sectional surfaces for a chosen number of easily accessible cross section surfaces of different cross sections for adapted work pieces so that a first processing of a first work piece, with its allotted cross sectional surface, rapidly and simply will be replaceable for the same and/or a different processing of said first and/or a second work piece with its allotted cross sectional surface, without therefore making it necessary to loosen and axially displace the respective chuck jaw portions with regard to the chuck-related main portion with its "direct" tightening surfaces for tightening or loosening word pieces with different or the same cross section without thereby having to limit the number of setting positions to four (4) in each one of the tracks of the chuck and where for such each position it is required that two screws must be loosened and removed, whereafter a utilized chuck jaw is manually to be able to be shifted to a new position, for again being fastened with its two screws and where each one of such shifting of the chuck jaws requires cleaning or cleansing in order to be able to ensure the desired accuracy.

There is a technical problem in being able to understand the significance of, the advantages related to and/or the technical measures and considerations which will be required for subdividing an earlier indicated chuck-related arrangement with its chuck jaws into a basic or inner chuck jaw portion and into an external or outer chuck jaw portion with its allotted clamping surface, wherein the basic chuck jaw portion of a first bolt arrangement is to be solidly fastened to the track related means (T-track nut) allotted to the main portion of the truck whereas the external chuck jaw portion is to be rotatably attached to said basic chuck jaw portion by means of a second bolt arrangement, so as to form a central shaft of rotation between the two parts over this bolt arrangement.

There is a technical problem in being able to understand the significance of, the advantages related to and/or the technical measures and considerations which will be required for indicating a stopping or a locking unit, which in its activated position is to be able to lock a rotational movement of the external chuck jaw portion relative to the basic chuck jaw portion for exposing a selected clamping surface among a plurality of clamping surfaces that may be chosen.

There is a technical problem in being able to understand the significance of, the advantages related to and/or the technical measures and considerations which will be required for letting such a chuck-related arrangement consist of solely five individual parts or portions, thus a basic or inner chuck jaw portion, an external or outer chuck jaw portion, two bolt arrangements and a locking unit, and therein to indicate a method of being able to retain these portions as chuck-allotted portions which is solidly attached by a bolt arrangement to said means, allotted to the main portion of the chuck.

There is a technical problem in being able to understand the significance of, the advantages related to and/or the technical measures and considerations which will permit each one of a number of selected and/or concurrent clamping arrangements having an allotted basic chuck jaw portion, to cooperate with an external chuck jaw portion which is rotatably disposed and oriented around an axis of rotation for the direct (or indirect) attaching of the work piece (and/or its release) intended external jaw chuck portion with its allotted clamping surface and wherein said external jaw portion is over a loosened or inactive locking unit to be related to its basic chuck jaw portion and rotatably disposed around a central shaft of rotation and that a locking unit with its allotted locking pin is to be disposed for locking, in an activated first stationary position, the rotational movement of the external chuck jaw portion relative to its allotted basic chuck jaw portion and in an inactivated second position exposing a rotational movement of the external chuck jaw portion and in addition thereto being able to offer, after removing a single second bolt arrangement, a radial displacement of solely the external chuck jaw portion in a direction away from the central axis of rotation.

There is a technical problem in being able to understand the significance of, the advantages related to and/or the technical measures and considerations which will be required for letting the external chuck jaw portion exhibit a pin-shaped portion facing the basic chuck jaw portion, whereas the basic jaw portion is to exhibit a radially oriented track facing the pin-shaped portion, up to the radially oriented and terminating track connecting to the pin-shaped portions cross-section.

There is a technical problem in being able to understand the significance of, the advantages related to and/or the technical measures and considerations which will be needed for letting the pin-shaped portion exhibit, in a cross section, a short dovetail or salmontail shaped portion, adapted to a cross section allotted to said dovetail shape.

There is a technical problem in being able to understand the significance of, the advantages related to and/or the technical measures and considerations which will be needed for letting the pin-shaped portion and an internal ending or terminating of the track be coordinated around a central axis of rotation.

There is a technical problem in being able to understand the significance of, the advantages related to and/or the technical measures and considerations which will be needed for letting the peripheral surface of the respective external chuck jaw portion exhibit a number, such as six or twelve, of recesses adapted for permitting the turning of an increase or elevation, allotted to an external chuck jaw portion, to pass one of prepared recesses for an adjacently disposed external chuck jaw portion.

There is a technical problem in being able to understand the significance of, the advantages related to and/or the technical measures and considerations which will be required for letting an elevated portion, allotted to a first external chuck jaw portion, be allotted a radial distance from its axis of rotation with a radius from its axis of rotation adapted to lie somewhat below a chosen radius for the same recess or a recess of a second external chuck jaw portion.

There is a technical problem in being able to understand the significance of, the advantages related to and/or the technical measures and considerations which will be required for letting a portion of said locking unit be allotted an external chuck jaw portion and having the external chuck jaw portion allotted radially distributed holes or recesses adapted for cooperating with a locking pin or similar allotted to the locking unit and taking an activated setting position.

There is a technical problem in being able to understand the significance of, the advantages related to and/or the technical measures and considerations which will be required for letting chosen external chuck jaw portions be coordinated for forming, together with their opposing elevations and/or recesses as clamping surfaces, a cross section which is adapted to correspond to, or at least essentially correspond to, a cross section allotted to a chosen work piece.

There is a technical problem in being able to understand the significance of, the advantages related to and/or the technical measures and considerations which will be required for letting one surface of the main portion be flat with three distributed and from a center axis extending tracks with individual means intended for a proper cooperation with individual basic chuck jaw portions, each with a rotatably disposed external chuck jaw portion.

There is a technical problem in being able to understand the significance of, the advantages related to and/or the technical measures and considerations which will be required for letting, among said clamping arrangements, each one of the mentioned clamping arrangements, shaped as two portions, be easily to connect to each other and be easily separable from each other, a first, as a basic chuck jaw serving portion, and a second, as an external chuck jaw serving portion, wherein the two portions are over a locking, pin or the like, within the locking unit, stationarily fastened to each other for defining a chosen external clamping surface or alternatively, in loosening the locking pin, being rotatably related to each other around a centrally oriented axis of rotation for thereby being able to expose and choose an available relevant clamping surface.

There is a technical problem in being able to understand the significance of, the advantages related to and/or the technical measures and considerations which will be required for letting two or more of the peripheral surfaces of an external chuck jaw portion be shaped with one or more, respectively, as a chosen clamping surface active against the piece of work, for thus letting opposing recesses form "direct" or "indirect" clamping surfaces of the clamping arrangements be disposed onto the work piece in the chuck.

There is a technical problem in being able to understand the significance of, the advantages related to and/or the technical measures and considerations which will be required for letting one or more external chuck jaw portions exhibit, with their clamping surfaces, elevations or projections directed radially and being positioned between recesses and opposing each other, wherein said elevations or projections (direct or indirect) shall be able to serve as clamp surfaces allotted to their clamping arrangements and being made to be able to face the work piece.

There is a technical problem in being able to understand the significance of, the advantages related to and/or the technical measures and considerations which will be required for letting the axis of rotation of the respective external chuck jaw portion center to a "stationary" chuck jaw portion be oriented parallel to the center axis allotted to the main portion.

There is a technical problem in being able to understand the significance of, the advantages related to and/or the technical measures and considerations which will be required for letting said locking unit, with its associated means, in the form of a locking pin, be allotted to the lower side of the external chuck jaw portion, whereas the external chuck jaw portion, which is coordinated in this manner, is to be allotted a number, such as a plurality, of axially oriented and peripherally distributed holes or recesses, adapted for cooperating with the locking pin allotted to the locking unit, said locking pin being displaceable forward and backward along a direction of movement oriented parallel to or at right angles to the axis of rotation of said external chuck jaw portion or the central axis of the chuck for being placed in an activable or an inactivable position.

There is a technical problem in being able to understand the significance of, the advantages related to and/or the technical measures and considerations which will be required for among said clamping arrangements letting each one be shaped such, that coordinated clamping surfaces over a simple rotational movement are to be indexed in each of a plurality of positions for being tightened against different cross sections without the need that the external chuck jaw portion must, in addition to said means allotted to the main portion, be moved radially along its track allotted to the chuck.

There is a technical problem in being able to understand the significance of, the advantages related to and/or the technical measures and considerations which will be required for among the mentioned clamping arrangements letting each one be shaped and processed for high accuracy in the setting up of work pieces by utilizing external chuck jaw portions consisting of a "soft" material and being easily processed and/or "hardened" material related to said external chuck jaw portions.

The Solution

As its starting point the present invention takes the known technology mentioned by way of introduction concerning a chuck-related arrangement having a main portion and a chosen number of chuck jaw portions coordinated with this main portion, wherein one of the surfaces of this main portion is provided with a number of tracks, such as two or more, each one adapted to displaceably support its allotted chuck jaw portion, which by a well known means allotted to the main portion or basic chuck jaw portions (T-track nuts) are to be displaceably disposed in a direction towards and away from each other so that in an assembled position these chuck jaw portions will hold a work piece intended for processing and in an open position these chuck jaw portions will be able to release a processed work piece from their tightened or clamped position for removing the work piece from its chuck jaw portions.

In order to solve one or more of the technical problems mentioned above the present invention more specifically indicates that the known technology is to be supplemented by letting a chuck jaw portion be subdivided, exposing a basic chuck jaw portion and an external chuck jaw portion, and over a loosened stop- or locking unit be rotatably related to the basic chuck jaw portion around a central axis of rotation of the two portions whereas a locking unit with its allotted locking pin or the like is to be adapted in an activatable first position or setting to lock the motion of rotation of the external chuck jaw portion relative to its allotted basic chuck jaw portion and in an inactivable second position or setting to release the rotational motion of the external jaw portion.

The present invention is particularly based on that the peripheral surface(-s) of an external or outer chuck jaw portion is to be capable of being shaped with one or more recesses and/or one or more elevations, such as in the form of protrusions, for at least letting two, thus coordinated and/or opposing recesses and/or elevations for individual external chuck jaw portions form direct or indirect clamping surfaces against the work piece, each one of, and/or a chosen number of, selected basic chuck jaw portions, which are each coordinated with their external chuck jaw portion, are to be adapted to form a chuck jaw portion allotted to the chuck and by means radially movable.

Furthermore it is indicated that the external chuck jaw portion is to exhibit a pin-shaped portion facing the basic chuck jaw portion whereas the basic chuck jaw portion is to exhibit a track which is oriented faceably against the pin-shaped portion and can cooperate with a radially oriented track, wherein the pin-shaped portion to advantage can exhibit a short portion or section of dovetail or salmontail shape in cross section.

The pin-shaped portion and an internal termination of the track should be coordinated around the central rotational axis applicable to the parts or portions.

The peripheral surface of the external chuck jaw portion should exhibit a number of recesses, such as six or twelve, adapted to permit a rotation of an elevation or projection allotted to pass an adjacent external chuck jaw portion, and one of the recesses of said adjacent external chuck jaw portion.

An elevation or projection allotted to a first external chuck jaw portion can then be allotted a radial extension from its central axis of rotation, with a radius from this axis of rotation being adapted to be somewhat shorter than a chosen radius for the same or a second peripheral elevation or projection of a second external chuck jaw portion.

Said locking unit can be allotted to a basic chuck jaw portion, whereas an external chuck jaw portion is to be allotted radially distributed holes or notches or recesses adapted for cooperation with a locking pin allotted to the locking unit, said locking pin taking an activable first solid position.

Selected external jaw portions can be coordinated so as with their opposing elevations and/or recesses as clamping surfaces being able to for a cross section which is adapted to correspond to, or at least essentially correspond to, the cross section of a chosen work piece.

In the mentioned clamping arrangements each one of two chuck jaw portions, rotatable with regard to each other, should be shaped as two individual parts or portions, easily combinable with each other and easily separateable from each other, a first one serving as a basic chuck jaw portion and a second one serving as an external chuck jaw portion, with the two portions being firmly related to each other over a locking pin in the locking unit or alternatively in loosening the locking pin rotatably related to each other around a central axis of rotation.

Advantages

The advantages which primarily must be considered to be characterizing of the present invention and the thereby indicated specific significant characteristics are that hereby prerequisites have been created for letting, in a chuck-related arrangement, one surface of a main portion and chuck jaw portions coordinated with this main portion, be provided with a number of tracks, such as two or more, adapted to have the chuck jaw portion radially displaceable (T-track nuts) and to solidly support said chuck jaw portions, which by the main portion means are radially displaceably disposed in a direction towards and away from each other so as in a combined position to let these jaw portions tighten and clamping a work piece intended for processing and wherein each one of a number of chosen chuck jaw portions have to release a (processed) work piece to be able to cooperate rotatably around a central axis of rotation oriented, for "direct" clamping of the work piece and/or release said work piece by said external chuck jaw portion.

Two or more of the peripheral surfaces of an external chuck jaw portion are then to be shaped with one or more recesses for permitting opposing recesses and/or elevations to form "direct" clamping surfaces against a work piece.

More specifically the existence is noted of the shaped basic chuck jaw portion which may be mounted and secured in known manner to the "T"-track nut of a "T"-track and a soft external chuck jaw portion having a dowel tailed track in the basic chuck jaw portion and can be locked against mutual rotation by means of a manually actuable locking unit, such as a wedge unit.

The subject matter which is considered to be primarily characterizing of the present invention and which is based on the principles defined in the preamble of Claim 1 is disclosed in the characterizing portion of the following Claim 1, whereas a method of combining, such as mounting together, an arrangement in accordance with the invention with available portions or units, is disclosed in the following Claim 14.

SHORT DESCRIPTION OF THE DRAWINGS

Known technology in chuck-related arrangements and a number of presently proposed embodiments, exhibiting the significant characteristics associated with the present invention, will now be more specifically described as an example with reference to the accompanying drawings, in which;

FIG. 3 shows in a first view an external chuck jaw portion, proposed on the basis of the invention from the back side, FIG. 4 shows the same external chuck jaw portion in a side view.

FIG. 5 shows the external chuck jaw portion in a front view.

FIG. 6 shows a center pin, belonging to the external chuck jaw portion, on a somewhat enlarged scale, and having a dovetail or salmontail shaped cylindrical portion in cross section, intended for rotatable cooperation with and displacement along a central recess, in a formed dovetail or salmontail shaped truck within said basic chuck jaw portion.

FIG. 7 shows in a perspective view the rear side of an external or outer chuck jaw portion and two remaining ones, only schematically indicated, for fastening a work piece.

Figure 13:
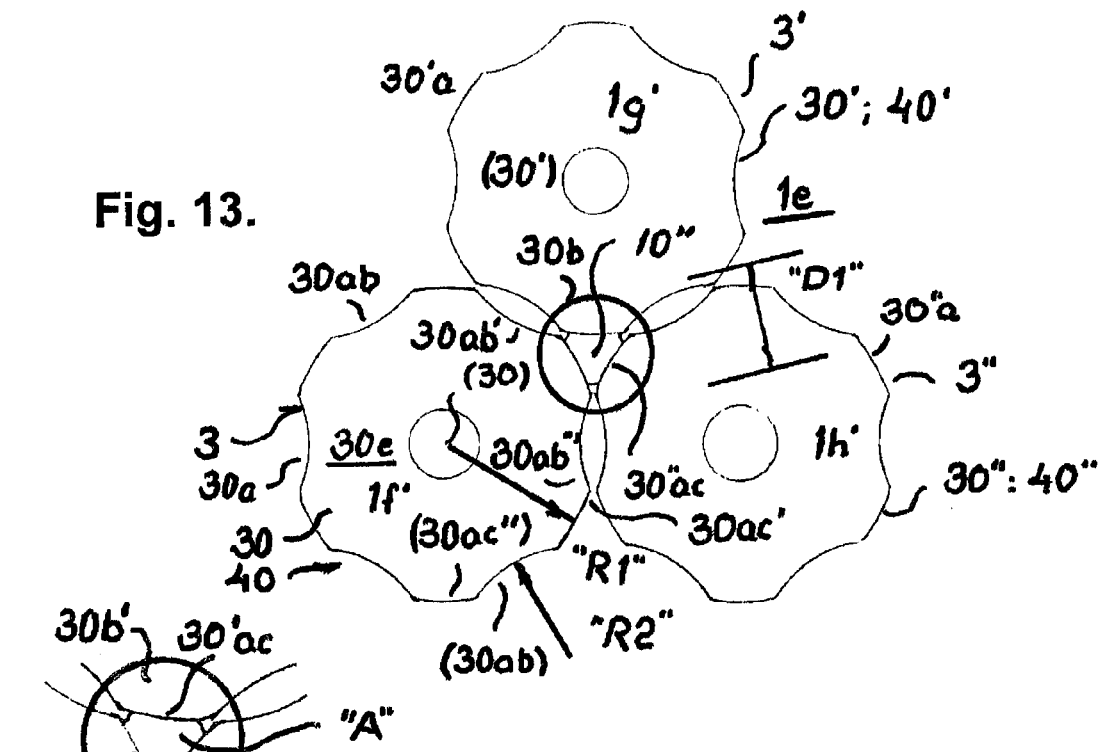

FIG. 13 shows a plan view of three coordinated clamping chuck jaw portions in the form of three external chuck jaw portions, adapted for being able to form a complete clamping arrangement within a chuck-related arrangement, although here shown schematically related to a main portion and a manner in which three external chuck jaw portions can be coordinated for forming over allotted and coordinated recesses and/or elevations i.a. forming a cross section corresponding to a triangle with equal sides in cross-section or a circle for the clamping surfaces corresponding to a triangular or circular cross-section of the work piece.

Figure 2:
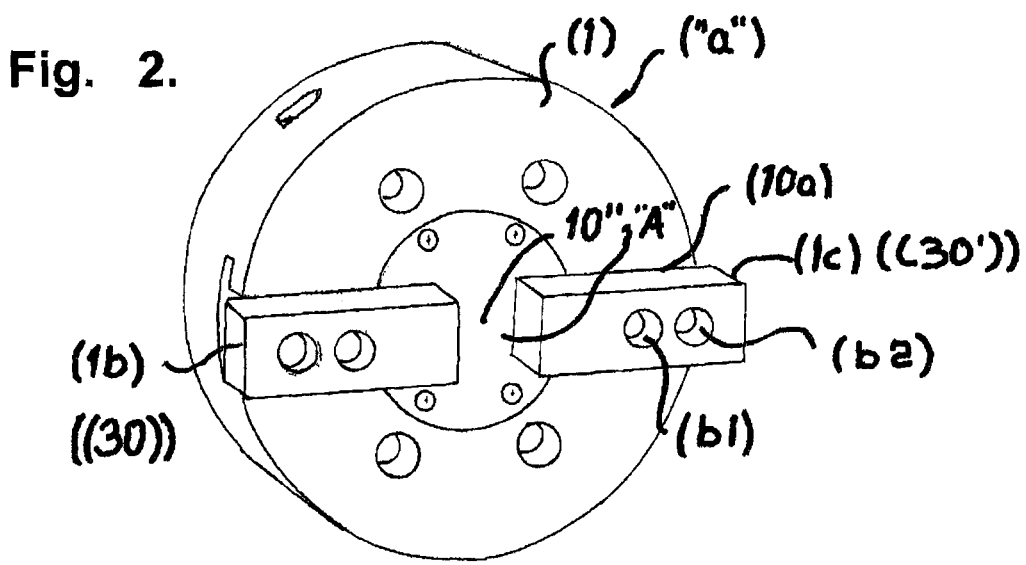
FIG. 2 shows a perspective view of a chuck designated BT200 sold by KITAGAWA (Large Thru-Hole High Speed Power Chuck) with two associated diagonally oriented chuck jaws, with which individual known and/or integrated chuck jaw portion can cooperate, over two commonly removable bolted joints, which can cooperate with a T-track nut.
Figure 14:
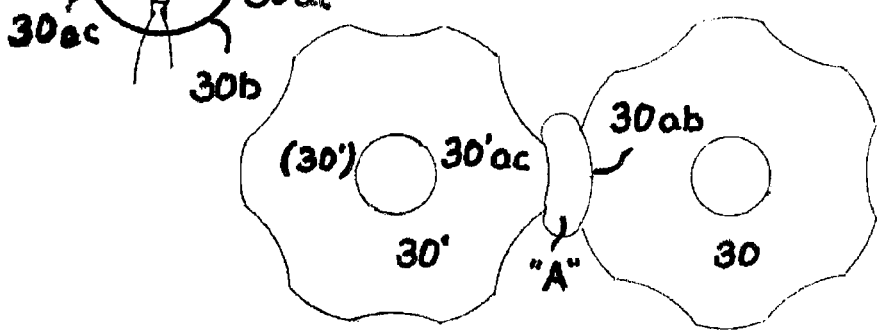

FIG. 14 shows that an increase in height or elevation of a first external chuck jaw portion and recess for a second external chuck jaw portion, oriented according to FIG. 2 in a two jaw chuck, can form an irregular cross-section for two cooperating and opposing clamping surfaces for the retaining or holding of an unprocessed work piece.

Figure 15:
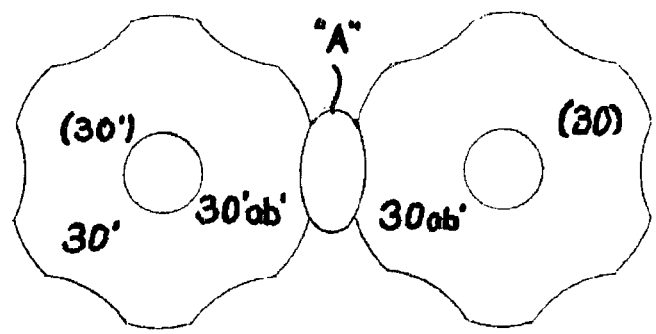

FIG. 15 shows that two opposing recesses for individual external chuck jaw portions, oriented according to FIG. 2 in a two jaw chuck, can form an irregular cross section for two coordinated and opposing clamping surfaces for holding an unprocessed work piece.

Figure 16:
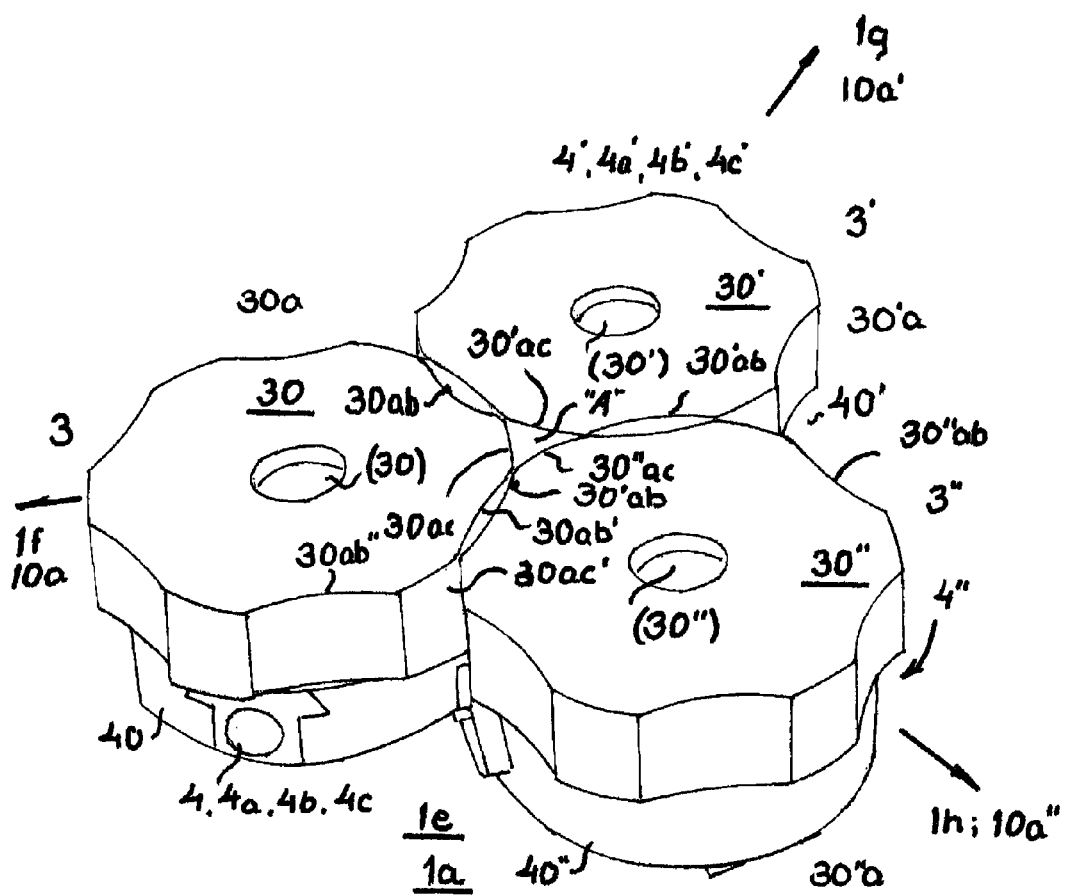

FIG. 16 shows three clamping arrangements, according to FIG. 13, in a perspective view and holding a work piece with the assistance of external chuck jaw portions and utilizing a triangular or circular cross-section, which is allotted to the work piece.

Figure 17:
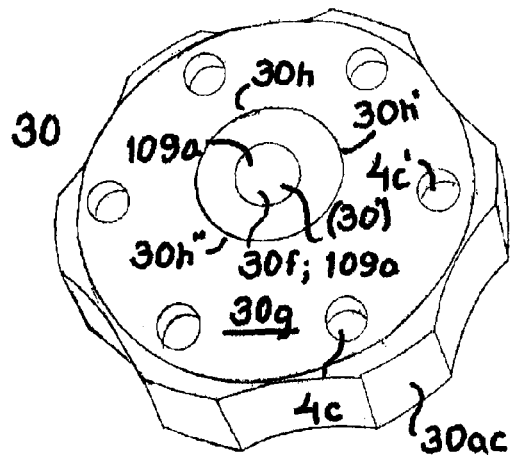

FIG. 17 illustrates the reverse (lower side) of an external chuck jaw portion.

Figure 18:
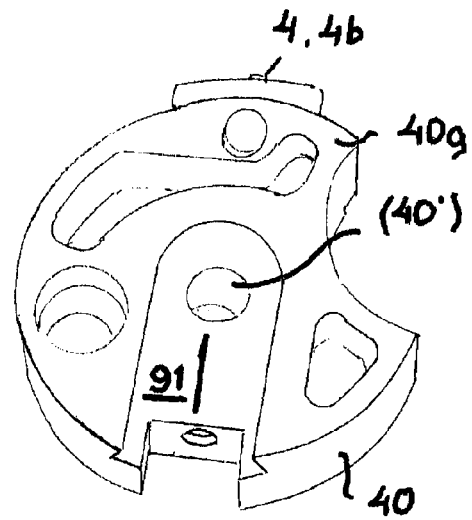

FIG. 18 shows the front surface of a basic chuck jaw portion adapted with a radially oriented track within the basic chuck jaw portion for a radially displaceable shaped portion or locking stud portion so as to, when the locking unit is inactivated, permit the external chuck jaw portion to carry out a rotatable motion relative to the basic chuck jaw portion over a dovetail or salmontail shaped track as viewed from the periphery of the basic chuck jaw portion and terminating in a centrally oriented termination in the basic chuck jaw portion adjacent to and around a central shaft of rotation.

Figure 19:
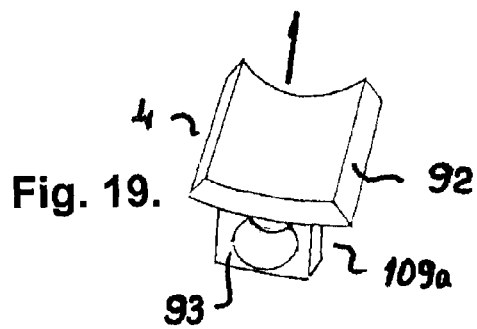
Figure 20:
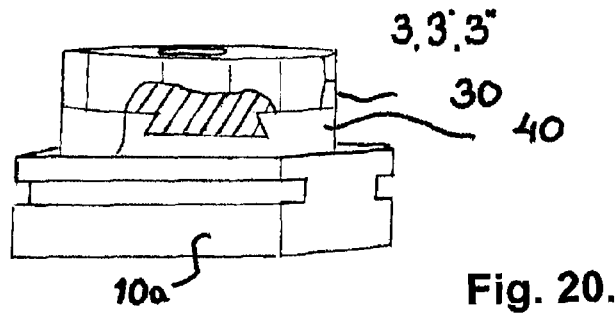

FIG. 19 shows a perspective view of an arrangement adapted to an alternative means allotted to a main portion for displacing a basic chuck jaw portion and an external chuck jaw portion radially along their allotted T-shaped tracks towards a centered termination of the track for being able to surround a center pin there, and FIG. 20 is illustrating an alternative arrangement.

Figure 25:
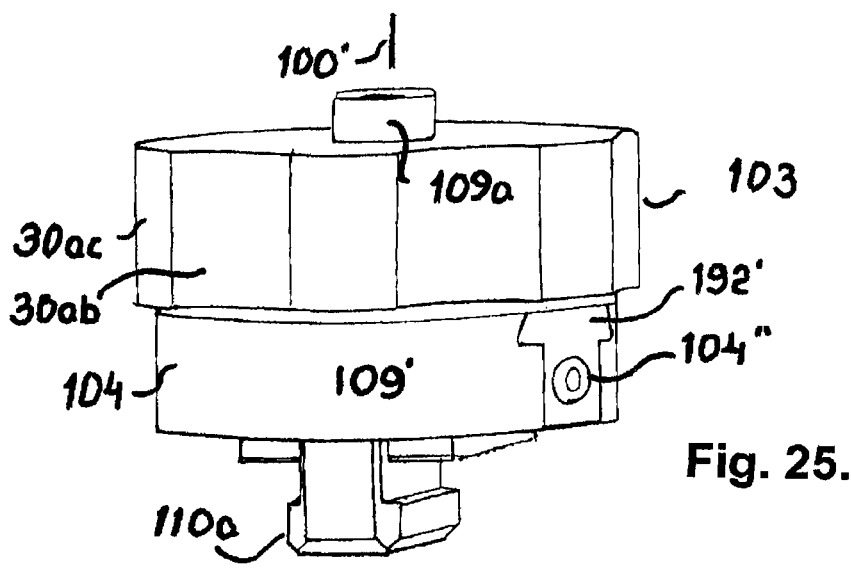
Figure 26:
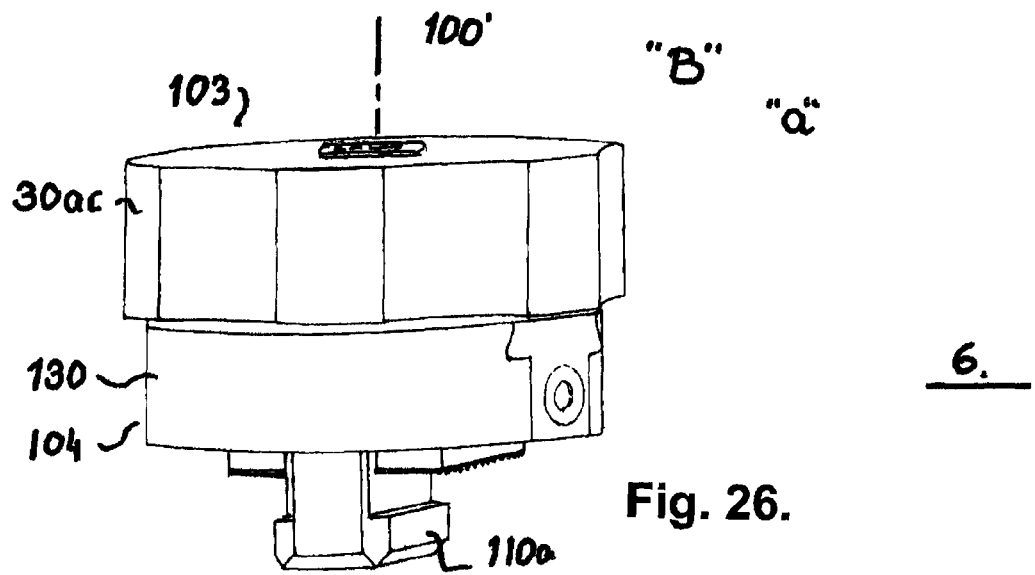
Figure 27:
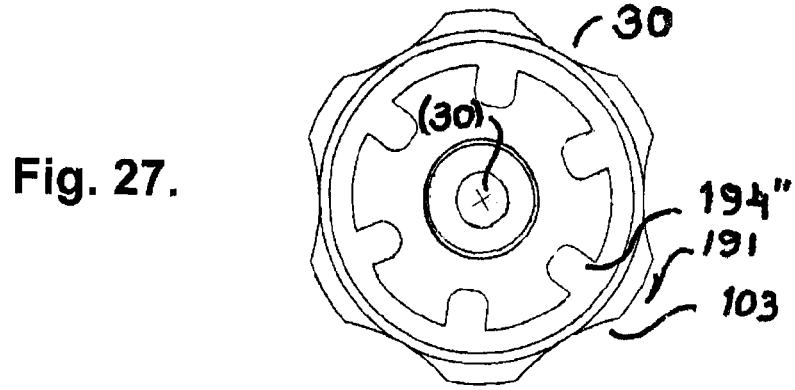

FIGS. 21 to 26 illustrate in six different processing steps, designated 1 to 6, a coordinating sequential process for mounting the individual parts or portions of a chuck related arrangement with an inner basic chuck jaw portion, an outer external chuck jaw portion, two bolt arrangements and a modified locking unit, and in FIG. 27 shows a plan view of the external chuck jaw portion with peripherally opened recesses in cooperation with a locking unit, allotted a radial pushing in and out for engaging said recess.

DESCRIPTION OF KNOWN TECHNOLOGY

Figure 1:
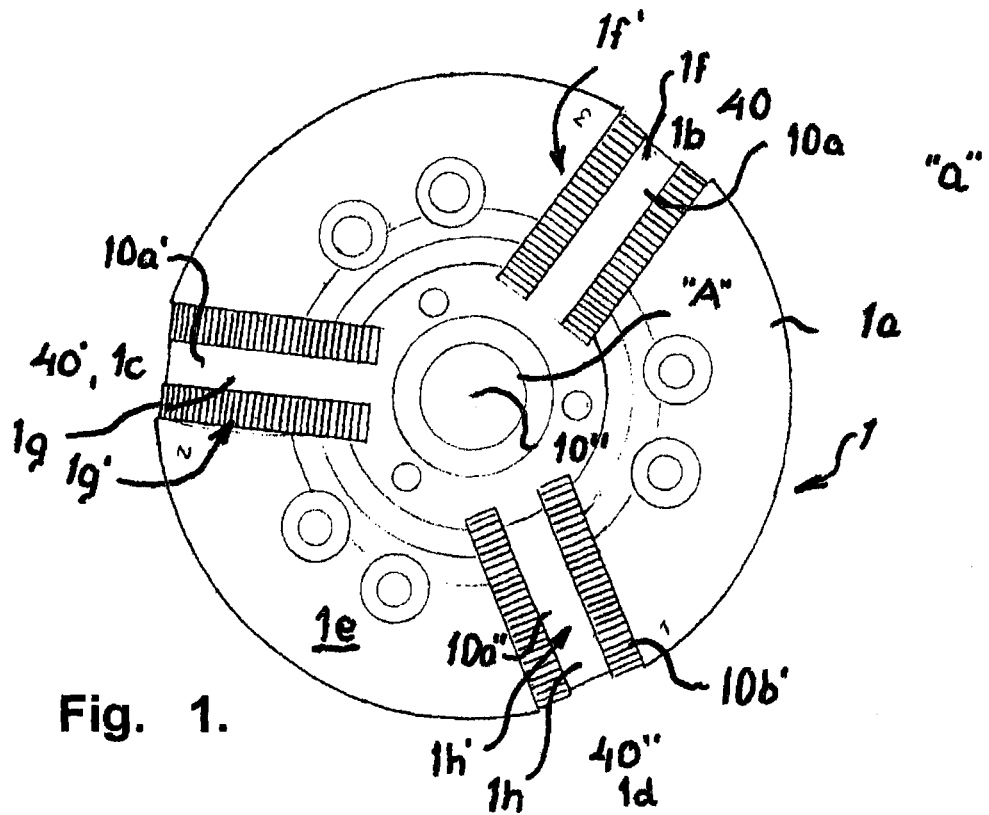
FIG. 1 shows a front view of a QJR-chuck (Quick Jaw Replacement Power Chuck) marketed by KITAGAWA (www.mta.kiw.co.jp) with three radially from a center shaft extending chuck jaws, not shown.

With reference to the accompanying FIGS. 1 and 2 here illustrate in a plan view and in a perspective view known technology, which technology the present invention can be considered as having as its background.

In both of the embodiments the chuck (1) and its main portion or part (1a) are to be provided with chuck jaws or parts (40, 40', 40") allotted to the chucks and having associated chuck jaw portions (1f', 1g' and 1h'), respectively and having a surface (1e) facing away from the chuck, said main portion (1a) being provided with a means or T-track nut (10a, 10a', 10a"), i.a., having the shape of a sawtooth and being adapted for cooperating with a corresponding sawtooth form (10b, 10b') (FIG. 8) for chuck jaw portions (1f', 1g' and 1h'). The chuck jaw-allotted portions (40, 40' and 40") are disposed displacebly forwards and backwards along their associated tracks (1f, 1g, 1h) by the means (10a) allotted to the chuck and its main portion (1a).

Thus, FIG. 1 shows a plan view of a chuck related arrangement ("a") having a main portion (1a) allotted to the chuck and a number, of three, not shown, chuck jaws with their positions allotted reference numerals (1b, 1c and 1d).

In the earlier mentioned chuck-related arrangement ("a") according to FIG. 1 with a main portion (1a) for the chuck (1) and three chuck jaws coordinated to this main portion having their mutual placing designated (1b, 1c and 1d), one surface (1e) of said main portion (1a) has been provided with a plurality of tracks (1f, 1g and 1h), two, three or more, adapted to radially displaceably support said, not shown, chuck jaws and their positioning (1b, 1c, and 1d), which by the main portion (1a) allotted known means (10a, 10a', 10a") (not more specifically shown, but as an example a manually actuable chuck key) are radially displaceably positioned in a direction of a center and away from each other from said center (10") for in a converging position having these chuck jaws with integrated jaw surfaces directly tension and fasten a work piece (not shown) intended for processing and in a reverse position having the chuck jaws release the work piece ("A") from its tensioned and tightening position for removing the work piece.

FIG. 1 illustrates that along the tracks the chuck jaw portions move with different placings (1b, 1c, 1d) cooperating with the means (10a) belonging to the chuck or allotted to it, with the chuck jaws here having been provided with reference numerals (1f', 1g' and 1h').

This particularly indicated chuck-related arrangement, which has been allotted reference designation ("a") in FIG. 1, has been provided with the purpose of being able to replace chuck jaws of specific structure with corresponding means for cooperation with the means (10a) allotted to the main portion (1a) so as thereby to offer short setup time for production of processed work pieces ("A") on a small scale or a large scale, bases.

FIG. 2 is a perspective view of a known arrangement (("a")) for a chuck ((1)) having solely two, diametrically oriented, chuck jaws, designated ((1b)) and ((1c)), the actuation of which in common can be carried out by a means ((10a)) corresponding to the means shown in FIG. 1.

This chuck-related arrangement (("a")) shows a possibility of in simple manner being able to grip and hold work pieces ("A") having a cross section deviating from a circular cross section and if desired exhibiting an irregular cross section, but has the inconvenience that rotating ((30), (30')) the chuck jaws ((1b), (1c)) initially requires loosening and removal of two bolt arrangements ((b1): b2)) and thereafter, at the side of the chuck (1) and loosened from the means (10a, 10a', 10a"), turning the chuck jaws 180° and thereupon fastening the bolt arrangements to said means again.

Description of Embodiment Now Proposed

By way of introduction it should be pointed out that in the following description of a presently proposed embodiment which exhibits the significant characteristics belonging to the invention and which are clarified by FIGS. 3-27 in the accompanying drawing we have chosen terms and a specific terminology with the purpose of thereby primarily clarifying the concept of the invention.

However, in this connection it should be pointed out that the terms chosen here are not to be seen as limiting solely to the terms utilized and chosen and that it is to be understood that each thus chosen term is to be construed such that it in addition covers all technical equivalents which work in the same or essentially the same manner so as thereby to achieve the same or essentially the same purpose and/or technical effect.

With direct reference to FIGS. 3 to 27, respectively, the specific qualities related to this invention in the proposed embodiments will be explained more specifically and described as well as a method of possible mounting or assembling of the arrangement in accordance with the invention. It is obvious that the demounting of the arrangement will be able to occur in the opposite direction.

Figure 8:
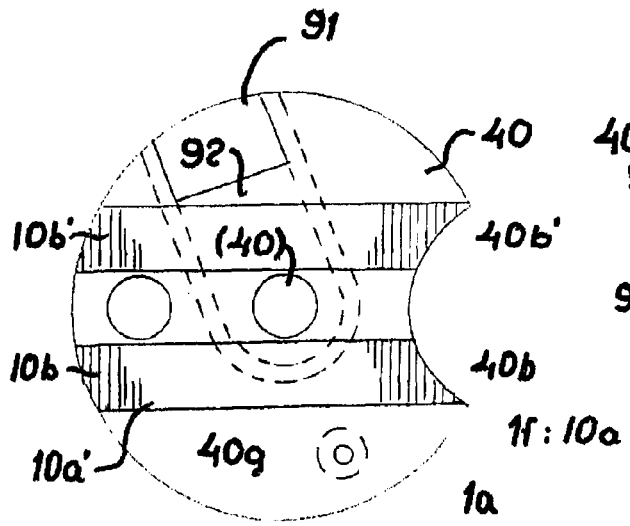
FIG. 8 shows a basic chuck jaw portion, proposed by the invention, said portion being shown in a plan view and occurring from the reverse side and the side which is intended to cooperate with the chuck and the means (T-truck nut) allotted to its main portion.
Figure 12:
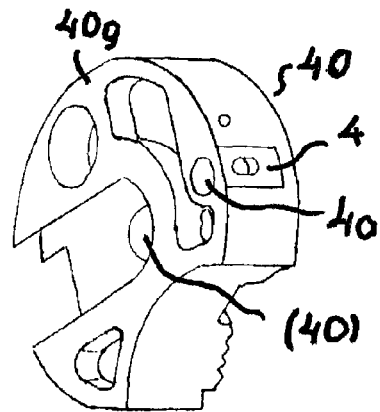
FIG. 12 shows the basic chuck jaw portion in a perspective view with the orientation of a locking unit and with its locking means only indicated.

The present invention is based on that a known clamping jaw portion and its clamping surfaces are to be shaped as an external chuck jaw portion ad its clamping surfaces (shown in FIGS. 3 and 7), and an inner chuck jaw portion, this latter portion is to be shaped as a basic chuck jaw portion (shown in FIGS. 8 and 12).

The chuck-related arrangement "a" according to the present invention is applied at one or more tracks 1f, 1g, 1h (see FIG. 1), said tracks having been provided with individual clamping arrangements, in which FIG. 7 shows one external chuck jaw portion 30 and FIGS. 13 and 15 illustrate a coordinated presence of three uniform clamping arrangements which here are designated 3, 3', and 3", respectively.

These clamping arrangements 3, 3', 3" can mutually have the same shape or mutually have different shapes within the frame of the present invention.

Each one of these and/or selected clamping arrangements 3, 3' and 3", respectively, is to consist of an external chuck jaw portion, 30, 30', 30", which is to be rotatably supported by a basic chuck jaw portion, 40, 40' and 40", respectively.

An external chuck jaw portion, such as 30, 30', and 30", respectively, also being rotatable, and having a stopping unit or a locking unit 4, 4', 4" (FIGS. 7 and 15) and a means 4a, 4a' belonging to the locking unit and having a locking pin 4, 4b', respectively, and having a stopping unit or locking unit 4, 4', 4" displaceably positioned through one of several available holes 4c, 4c' for locking the movement of rotation of the external chuck jaw portions 30, 30', and 30", respectively, with regard to their locked basic chuck jaw portions 40, 40', 40" in a selected position.

Each one of the clamping arrangements 3, 3', and 3", respectively, is to be able to consist of its basic chuck jaw portion 40, 40' and 40", respectively, which rotatably and centrally over a second bolt arrangement (109a in FIGS. 21 to 26) is to be able to cooperate with its associated external chuck jaw portion 30, 30' and 30", respectively.

Even though FIG. 13 shows three coordinated external jaw portions 30, 30', and 30", respectively, whose periphery clamping surfaces 30a, 30"a, and 30"a, respectively, are essentially identical here, it should be noted that within the scope of the into there are different external chuck jaw portions having entirely different shapes of their peripheral clamping surfaces 30a, 30'a, and 30"a, respectively, all with the purpose of in a coordinated position being able to simply form to corresponding clamping surfaces and having "coordinated" clamping surfaces adapted to the cross section of a work piece "A". (The cross-section of work piece "A" in FIG. 13 can take the form of a triangle with equal sides or of a cylinder).

Coordinated and opposing clamping surfaces means that two or more, such as three, clamping surfaces 30ac, 30'ac, and 30"ac, respectively (enlarged view in FIG. 13), are adapted to be able to cooperate peripherally with the work piece "A".

Although FIG. 13 illustrates that for its peripheral clamping surfaces, the ones shown with reference designations 30a, 30'a, and 30"a, have been provided with "six" elevations or equal projections 30ac, 30ac', and 30ac", respectively, and "six" recesses 30ab, 30ab', 30ab", in between, essentially equal mutually, it should be noted that within the scope of the invention there are also different shapes of the projections and their locking or clamping surfaces and different shapes of the recesses and their locking surfaces and that these locking surfaces are to be able to be rotated simply to mutual cooperation, such as according to FIGS. 14, and 15, respectively.

Thus, FIG. 13 shows that each one of or a number of chosen and/or all of the chuck jaw portions 1f', 1g', and 1h', respectively, are to be replaced into individual piece of basic chuck jaw portions 40, 40', and 40", respectively, which are rotatably to support their external chuck jaw portion 30, 30', 30", but are to be locked relative to each other over an activated locking means 4a, 4a', in the form of a stopping or locking unit 4, 4'. (FIG. 16).

Each one of these parts, such as the basic chuck jaw portion 40 and the external chuck jaw portion 30 of the clamping arrangement 3, is disposed rotatably around an axis of rotation (30) allotted to the external chuck jaw portion 30 allotted to axis (30) of rotation which can be shaped by another (a second) bolt arrangement 30f.

For the function of the work piece "A" clamping to attachment direct or indirect (and/or the releasing) function, the external chuck jaw portion 30 is utilized together with the two additional external jaw portions 30' and 30", respectively, wherein two or preferably three external clamping portions, with their recesses and/or elevations, may be coordinated for the attaching or tightening function, according to FIGS. 13 and 16.

More particularly, the invention indicates that two or more peripheral surfaces 30a, 30'a, and 30"a, respectively, of said external portions are to be provided with one, two or more, such as twelve, recesses 30ab, 30'ab, 30"ab (along the periphery 30a) for by a turning motion around its central axis (30) of rotation letting two opposing recesses 30ab', 30'ab', according to FIG. 15, form directly opposing clamping surfaces against a work piece "A".

Three of the peripheral surfaces 30a, 30'a, and 30"a, respectively, of said external peripheries 30, 30', and 30", are according to FIGS. 13 and 16 provided with individual elevations or projections 30ac, 30'ac, 30"ac that may be coordinated for forming coordinated and opposing direct clamping surfaces against a work piece "A".

The invention also indicates that two external portions 30, 30' can be rotated to specific opposing positions so that a recess 30ab and an elevation 30'ac disposed according to FIG. 14 can form direct clamping surfaces against a work piece "A".

One or more radial elevations lying between recesses 30ab', 30ab", such as 30ac, can thus form direct clamping surface against a work piece "A" having a circular cross section and/or as illustrated here having a triangular cross section.

Said external portion 30 is positioned pivotal or rotatable around an associated horizontal center line or center axis (30) of rotation (FIGS. 7 and 13), and one surface 30e of said external portion is to be disposed at right angles to said axis (30) of rotation formed by a second bolt arrangement 30f for rotatable operation between the basic chuck jaw portion 40 and the external chuck jaw portion 30 or the opposite.

The axis (30) of rotation of the respective external chuck jaw portion 30 is disposed parallel to the center axis or axis of rotation 10" (FIG. 2) of the chuck.

The respective clamping arrangements 3, 3', and 3", respectively, and the peripheral surfaces 30a, 30'a and 30"a, respectively, are subdivided into clamping surfaces such as 30ac, 30'ac, 30"ac, in FIG. 13, and exhibit a number of clamping surfaces, such as twelve, wherein a first clamping surface 30a has been provided with six recesses 30ab, 30ab', and 30ab", respectively, etc. as well as six elevations or projections 30ac, and 30ac', etc., wherein each recess, such as 30ab, is adapted to permit rotation of an elevation 30'ac allotted to an adjacent clamping unit 30' so that this elevation 30'ac can be brought past a recess (30ab) for a clamping arrangement 3 and its external portion 30.

Corresponding dimensioning is to advantage to apply to the remaining clamping arrangements 3' and 3" and the external chuck jaw portions 30' and 30" thereof.

An elevation (30ac") allotted to external portion 30 is then to be allotted a radial extension from its central axis (30) of rotation with an inner radius "R1" from its axis (30) of rotation adapted to be somewhat smaller than a chosen external radius "R2" for a second recess (30ab) or the same recess 30ab of the external chuck jaw portion 30.

FIGS. 7 and 13 also illustrate that if the external portions 30, 30' and 30", respectively, are made of a "soft" material, a track and/or a recess 30b' can be turned or formed in a lathe and be adapted with a line 30b of a circle practically completely to retain by tension extremely thin walled work pieces "A". One single line 30b of a circle is, as an embodiment, more specifically illustrated in an enlarged central partial illustration applicable to FIG. 13.

Within the frame of the invention there is also a possibility of increasing or reducing a diameter "D1" of this circle line 30b and of adapting the depth of a turned cavity 30b' into the portions 30, 30', and 30", respectively, of the external portions 30, 30', and 30", respectively.

A stopping means or a stopping or locking unit 4 having a locking pin 4b as indicated is disposed with its locking pin displaceable forwards and backwards ("P1" in FIG. 7) in order in a first locked position to lock the turning motion of the external chuck jaw portion 30 relative to its allotted basic chuck jaw portion 40 and in a second position to release the movement of rotation of the external portion around its central axis of rotation 10'.

Said stop or locking units 4, 4', 4", according to FIG. 16, are allotted individual basic chuck jaw portions 40, 40', 40", whereas each external chuck jaw portion 30, 30' and 30" (FIG. 7) can be allotted a number of radially positioned and peripherally distributed holes 4c, 4c' or recesses, adapted for cooperation with a stopping or locking unit 4, 4' allotted to its locking pin 4b, 4b', said locking pin being axially displaceable between an active locking position or an inactive releasing position along the direction of motion "P1" positioned parallel to said central axis (30) of rotation with its center axis 10'.

Two or three selected clamping arrangements 3, 3', 3" with their external chuck jaw portions 30, 30', 30" are coordinated, in accordance with FIGS. 7 and 16, for forming, with their projection-like elevations 30ac, 30'ac, and 30"ac, respectively, and/or recesses 30ab, 30'ab, and 30"ab, respectively, as clamping surfaces form a cross-section which is adapted to correspond to or at least essentially correspond to a cross section of a chosen work piece "A" according to FIGS. 7, 13, 14 and 15, respectively.

One surface 1e (according to FIGS. 1, 13 and 16) of the main portion is flat with three radially distributed and from the center axis 10" extending tracks 1f, 1g, 1h intended for cooperation with via the T-track nut properly adapted individual basic chuck jaw portions 40, 40', and 40", respectively, with individual centrally and rotatably disposed external chuck jaw portions 30, 30', and 30", respectively.

Among the mentioned clamping arrangements 3, 3' and 3" each one can consist of two portions, which may be easily connected with each other and easily separable from each other, a first one serving as a basic chuck jaw portion 40 and the second one serving as an essentially circular shaped external chuck jaw portion 30 wherein the two parts are rotatable with regard to each other over the centrally positioned axes of rotation (30), (30'), and (30"), respectively, extending through individual external chuck jaw portions 30, 30', 30" and basic chuck jaw portions 40, 40', 40" (see FIG. 16).

In this embodiment it is proposed that each basic chuck jaw portion 40, 40', 40" is in a known manner to be able to be adapted to cooperate directly with the means 10a in the form of a T-track nut of the main portion 1a.

In another embodiment having three chuck jaw portions 1f', 1g' and 1h', respectively, a single basic chuck jaw portion 40, 40' or 40" and an external chuck jaw portion 30, 30' or 30" being rotatably fastened cooperate directly with the means 10a, 10a' and 10a", respectively.

Each one of the external chuck jaw portions, such as chuck jaw portion 30 in FIG. 7, is rotatably positioned around its central axis (30), 10' of rotation and adjustable to a solid position among a plurality of accessible positions where each solid position can be defined as said holes 4c, 4c'. The remaining external chuck jaw portions are rotatably positioned in the same manner.

With reference to FIG. 14 it is shown there that an elevation 30'ac for an external clamping portion 30' and a recess 30ab for another adjacent external chuck jaw portion 30 can form an irregular cross section for two coordinated and directly opposing clamping surfaces for attaching an unprocessed work piece "A".

FIG. 15 shows that two recesses 30'ab'; 30ab' for individual external chuck jaw portions 30', 30 can form an irregular cross-section for retaining an unprocessed work piece "A".

In FIG. 17 the surface 30g (lower side) facing the upper surface 40g of the basic chuck jaw portion 40 and in FIG. 18 a basic chuck jaw portion 40 with a surface 40g faceable towards the external chuck jaw side 30g where this surface 40g is adapted to and provided with a dovetail or salmontail shaped track 91 for a locking means shaped as a locking block 92 for permitting a locking means to allow an external chuck jaw portion 30 with a centered rotational pin 30h a rotatable movement relative to its basic chuck jaw portion 40 over the centrally disposed and coordinated axes of rotation (30'), (40'). For this a locking unit 4 is used for locking the rotational movement of the parts.

With reference to FIGS. 17 and 18, the latter shows in a perspective view the basic chuck jaw portion 40 with an external chuck jaw portion 30 placed on the side and from this Figures it may be seen that both parts 40, 30 are shaped with individual central holes (30') and (40') intended for a mutual rotational pin 30h for guiding a shaft 30f in the form of a second bolt arrangement for its rotatable fastening.

Furthermore, FIGS. 7, 13 and 16 illustrate a chosen number of stop or locking units 4, 4', 4" or means 4a, 4a', 4a" allotted to peripherally disposed holes 4c, 4c' in the external chuck jaw portion 30.

As may be seen in FIG. 18 the basic jaw portion 40 exhibits a radially extending track 91, which is salmon tail shaped in cross section, and is intended for slideable cooperation with a pin-shaped portion 30h' in the external chuck jaw portion 30 and which portion 30h' becomes readable in its inner position on the one hand by a bolt arrangement 109a and on other hand by locking said block 92 for permitting a desired rotational movement of the external chuck jaw portion 30.

In cross-section the external chuck jaw portion 30 exhibits a salmon tail shaped circular part 30h' which is to be enclosed by a rail 91 and is to be locked in its central position by a bolt arrangement 109a, 30f.

In a coordinated and rotatable position between the fixed basic chuck jaw portion 40 and the external chuck jaw portion 30, the latter can be locked by means of a locking block 92 and a bolt connection 93 which may be screwed into block 92 and be locked in a chosen position by letting said locking block 92 cooperate with and support an inner partial portion 30h', within the external chuck jaw portion 30.

One of the three external chuck jaw portions is illustrated in different views in FIGS. 3 to 7, viz. the one which is designated 30.

In FIG. 3 the recesses are evenly distributed, such as 30ab, 30ab', 30ab" with intermediately disposed elevations or projections, such as 30ac, 30ac', the latter located adjacent to a marked hole 4c.

FIG. 4 illustrates in a side view the salmon tail shaped pin or portion 30h, which in the form of a cap 30i is to cooperate with the surface 30g of the external chuck jaw portion 30.

FIG. 5 illustrates the external chuck jaw portion in a front view.

FIG. 6 illustrates in a side elevation view a central pin arrangement 30h related to the external chuck jaw portion 30.

FIG. 7 illustrates an external chuck jaw portion 30 with an elevation 30ac cooperating with a work piece "A" together with two in FIGS. 13 and 16 shown schematically indicated external chuck jaw portions 30' and 30", respectively, in the clamping arrangements (3') and (3").

FIGS. 8 to 12 illustrate in different views one of three basic chuck jaw portions, viz. the one that is designated 40.

FIG. 8 illustrates the surface 40g, which is to face and be in direct cooperation with the track 1f allotted to the chuck and its means 10a, wherein saw tooth shaped surfaces 10b, 40b; 10b', 40b' are adapted for a solid cooperation with corresponding surfaces of the part 1f', 1g' allotted to the chuck jaws, as shown in FIG. 1.

Figure 9:
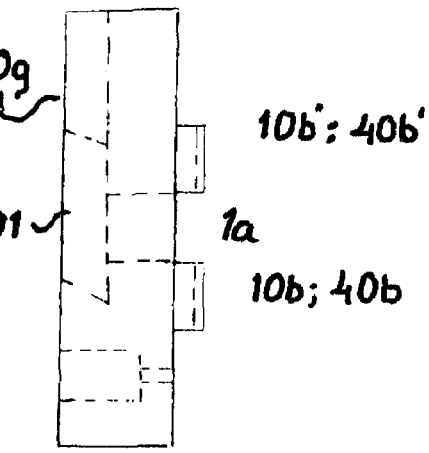
FIG. 9 shows the basic chuck jaw portion in a first side view.
Figure 10:
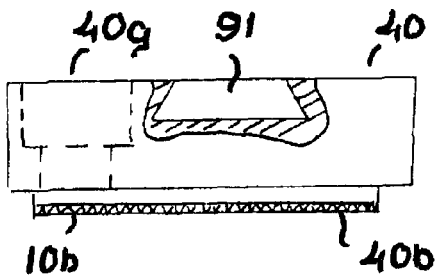
FIG. 10 shows the basic chuck jaw portion in a second side view (turned 90°) and partly in a cross-section.
Figure 11:
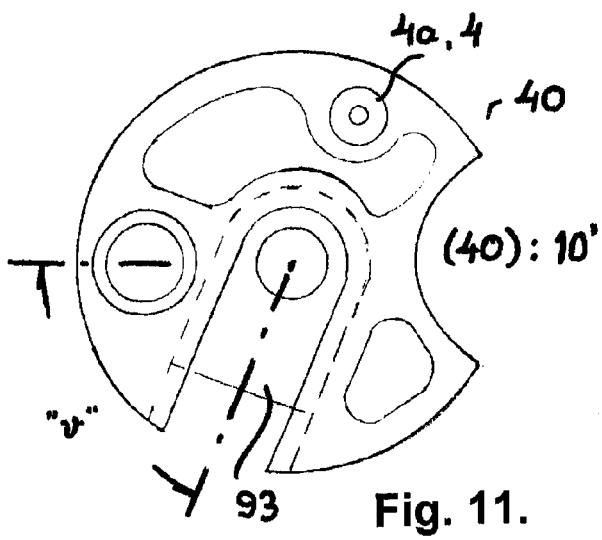
FIG. 11 shows the basic chuck jaw portion in a plan view and exposing the side which is intended to cooperate with its associated external chuck jaw portion.

FIGS. 9, 10 and 11 shows the basic chuck jaw portion 40 in different views, wherein FIG. 12 shows the basic chuck jaw portion 40 in a perspective view. Compare also FIG. 18.

Chucks according to FIG. 1 and according to the present invention have a saw tooth affixing of their jaws or portions allotted to the basic chuck jaw portions. Two standard embodiments are known here, a first one with a pitch of 1.5 mm×60° and a second one with a pitch of 1⁄16"×90°.

The jaws have the same type of tooth dividing/degree and are normally disposed in local positions to the chuck (equal distance from the center axis 10").

Standardized "soft" external chuck jaw portions 30 are adapted on the basis of their tooth divisions to be moved out and in from the center axis 10" of the chuck 1.

The outer or external chuck jaw portions 30, 30', 30", in accordance with the invention, can be placed so close to the center shaft 10" of the chuck 1 that their clamping surfaces being turned "just exactly" to pass each other.

The input angle "v" of the salmon tail shaped track 91, illustrated in FIG. 11, towards its central axis of rotation (40); 10' is chosen to between 20° and 25°, such as around 22° (as compared to a line oriented at right angles to the center axis 10" of the chuck).

This arrangement is required "soften" clamping chuck jaw portions 30, as clamping chuck jaw portions, to be replaceable without moving the jaws completely out from the center axis 10". If at the same time a larger angle would have been chosen this would mean a smaller or more narrow salmon tail shaped track 91. The outer fastening holes counter sinking for tightening constitutes a limitation of the structure here.

Before the clamping surfaces 30ac, 30'ac and 30"ac, respectively, are turned in a lathe in accordance with the above mentioned, a track 30b for the purpose of tightening, ordinarily for adapting the tightening of a specific work piece "A", is turned in a lathe. According to the instructions of the invention it becomes possible to achieve a large tightening surface. This is an advantage when a tubular work piece with thin walls is to be set up in the chuck 1 without being deformed by the tension forces of the clamping portions, as these tightening forces will act around the whole tightening surface.

It is possible to carry out twelve indexing, which enables two concave surfaces to oppose each other in a working position, for example when the need of turning bigger work pieces in the lathe exists.

This has also turned out to be an advantage when rounded external chuck jaw portions are used (without convex or concave jaw surfaces). Twelve positions can be utilized here for comparatively small tightening surfaces and can be used in a small number of positions when the work piece has a large diameter.

It should also be noted that the peripherally oriented holes 4c, 4c' are to advantage to be disposed such, that in indexing the clamping chuck jaw portions the elevations will have a position towards the center axis 10" at the same time as an index bar in the form of a locking pin 4b would become easily accessible.

In order for the recesses 30ab, 30'ab, 30"ab to be indexed, additionally six holes are proposed.

With regard to the present invention it will also indicate the existence of three clamping arrangements 3, 3', 3", each one taking the form of a basic chuck jaw portion 40, 40', 40" and an external chuck jaw portion 30, 30', 30", with this clamping arrangement also being fastened to the chuck 1 by means of two screws or bolt arrangements 109a, 109b. However, according to FIGS. 21 and 26 the external chuck jaw portion (30), 103 is to be able to rotate in relation to basic chuck jaw portion (40), 104 with the help of a bolt arrangement 109a. The basic chuck jaw portion 104 is to be attached to the means (10a), 110a with the help of a bolt arrangement 109b.

The clamping arrangement, related to the present invention, will now be described more specifically in a detailed and accompanying sequence designated one (1) to six (6) in FIGS. 21 to 26 of a mounting procedure or method in which the clamping arrangement "B", which is to consist of a basic chuck jaw portion 104, an external chuck jaw portion 103 and to have the basic chuck jaw portion 104 solidly coordinated with a chuck 100 and its associated means 110a (104") which are to be mounted in the manner which is known in the "T"-track nut of a chuck.

Figure 21:
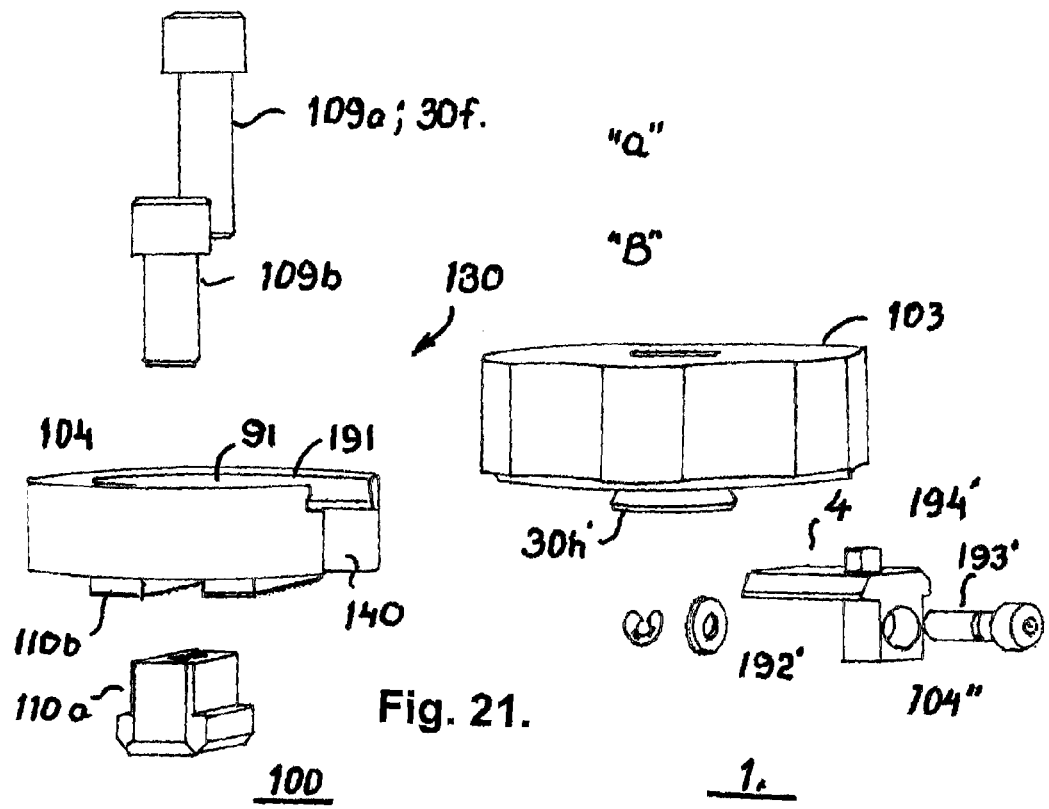
Figure 22:
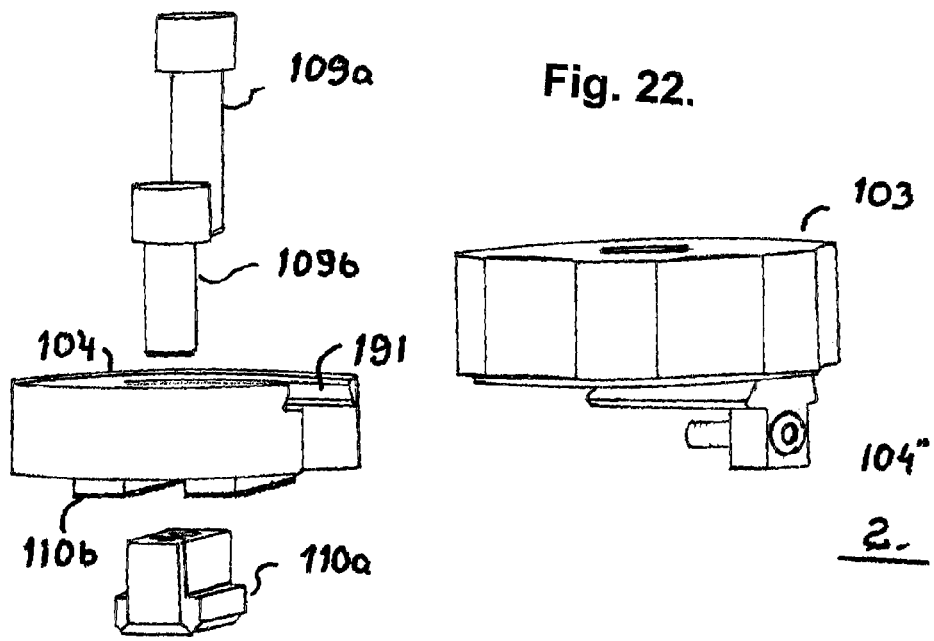

The individual parts, units or portions in FIG. 21, under section "1" are in an alternative chuck-related arrangement "a" illustrated in a ruptured view.

Thus, a clamping arrangement 130 is shown there, having two bolt arrangements 109a, 109b, an outer or external chuck jaw portion 103 and a basic chuck jaw portion 104 provided with a saw tooth section as well as a stop or locking means 104" with a wedge-shaped means 192' having a screw 193' and a locking heel 194' or wedge 192'. Furthermore a known T-track nut 110a related to chuck 100 is shown.

One of the bolt arrangements 109b, (30f) is to keep the basic chuck jaw portion 104 attached to the chuck 100 and its means 110a whereas the other bolt arrangement 109a (30f) is to be centered so as, somewhat loosened, to be able to permit a rotational motion of the outer or external chuck jaw portion 103 relative to the basic chuck jaw portion 104 and to have a stop or locking means 104" for locking the external chuck jaw portion 103 in a chosen position as compared to its basic chuck jaw portion 104.

FIGS. 22 to 26 illustrate in sections "2" to "6" the sequential order in which the chuck related arrangement "a" is to be able to be assembled.

Section 2 illustrates the manner in which the locking means 104" is to be mounted to the external chuck jaw portion 103. Section 3 illustrates how the basic chuck jaw portion 104 is fastened to a T-track nut 110a with the assistance of bolt arrangement 109b, Section 4 illustrates a displacement of the external chuck jaw portion 103 relative to the basic chuck jaw portion 104, Section 5 illustrates how the bolt arrangement 109a, 30f connects portions 103 and 104 to each other for a mutual rotational movement and in a chosen setting position of the parts 103 and 104 they are locked by the locking means 104".

The peculiarity related to this invention lies in a soft outer chuck jaw portion being mounted against this basic chuck jaw portion 104 as an external chuck jaw portion 103 over a track 191 in the basic chuck jaw portion 104 and a centered pin 109a in the external chuck jaw portion 103 and being secured to this chuck jaw portion 104 with a wedge 192' and as a bolt arrangement 109a, 30f serving as a center of rotation.

The external chuck jaw portion 103 can by means of its rotation around its central axis 100' of rotation in the form of a center bolt 109a serving as a bolt arrangement now be indexed to six (6) or twelve (12) different positions over an activated locking unit or a locking unit 104", according to Sections 5 and 6.

By solely bringing out a wedge 192, (say 5 mm) in the embodiment of FIG. 25, and section 5, an indexing can occur to each new position by rotating the external outer chuck jaw portion 103 as compared to the basic chuck jaw portion 104.

A changed indexing, according to section 6 and FIG. 26, can here occur by a rotational movement of the external chuck jaw portion 103 without an axial and/or radial motion and when it according to the instructions of the invention rather is locked from such axial motion.

Salmon tail track 191 and the stopping or locking means 104" makes it possible to avoid the mounting of a clamping external jaw portion 103 in the setting up of different work pieces.

Although FIGS. 21 to 26 shows a method of mounting a chuck-related arrangement, in accordance with the present invention, the present invention indicates that demounting of such arrangement can occur in a reversed direction.

Although claim 14 is directed to a method of mounting the arrangement in accordance with the invention it should be noted that the unambiguously disclosed mounting sequence can be made the subject of a modified order sequence without therefore leaving the basic concept of the invention.

The invention is of course not limited to the embodiment stated above as an example and can be subject to modifications within the frame of the inventive concept illustrated in the following claims.

It is particularly indicated in FIG. 21 to 26, that in stead of the projection 194' in an outer chuck jaw portion 103 being introduced to the track 191 in a radial direction and can be brought into the track 191 for cooperation with a "V"-shaped slit 194" for locking the rotational motion of the external chuck jaw portion 103, it may be displaced for leaving the slit for making possible said rotational motion. With the help of a screw the slit 194" can be locked and blocked in its innermost position.

It should be particularly noted that each illustrated unit and/or circuit can be combined with every other illustrated unit and/or circuit within the frame of being able to achieve the desired technical function.

The basic chuck jaw portion has in FIG. 27 being provided with a slit 194" as a locking unit between said basic jaw portion and its external jaw portion.

The invention claimed is:

1. A chuck-related arrangement ("a") having a main portion (1a, 1e) and chuck jaw portions coordinated to said main portion (1a) with associated clamping arrangements (3, 3', 3"), wherein one planar or flat surface (1e) of said main portion is provided with a plurality of tracks (1f, 1g, 1h), two or more, adapted to displaceably carry said chuck jaw portions (40), which by means (10a) allotted in the main portion (1a, 1e) are displaceably disposed in a direction towards and away from each other for having said chuck jaw portions in an assembled position clamp a workpiece ("A") intended for processing and in an opposing position letting these chuck jaw portions release said workpiece ("A") from its tightening position for removing the workpiece wherein each one of or a chosen number of selected chuck jaw related clamping arrangements (3, 3', 3") is individually formed as two parts, a first part, as a base chuck jaw portion (40, 40', 40"), with a thereto related, around a central axis of rotation ((30) (10')) rotatably oriented axis for tightening and/or releasing the work piece ("A"), a second part, as an external or outer chuck jaw portion (30, 30', 30"), and with said two parts interrelated by a blocking or locking unit (4, 104"), characterized in that said first part (40) and said second part (30) are coordinated by preforming a radially directed displacement, that said first and second parts (40, 30) are interrelated via a dovetail shaped track (91) and a dovetail shaped cylindrical portion (30h), that these parts (40, 30) are oriented adjacent to each other by exposing said radially oriented displacement along a plane or flat surface oriented between planar or flat surfaces, facing each other and related to said first and second parts (40, 30), that said blocking and locking unit (4, 104") is disposed between said first and second parts and in its operative position blocks the second part from rotating around an axis of rotation in relation to said first part and in its inoperative position permits the second part to rotate freely around said axis of rotation, and that a block (92) is introduced into said track (91) to prevent said second part from carrying out a radial displacement motion from its axis of rotation.

2. A chuck related arrangement as stated in claim 1, characterized in that said blocking and locking unit (4) includes an axially oriented pin which may be brought to an operative position or to an inoperative position.

3. A chuck related arrangement as stated in claim 1, characterized in that said block (92) is formed with a bolt connection (93).

4. A chuck related arrangement as stated in claim 1, characterized in that the peripheral surface (30a, 30'a, 30"a) of said external chuck jaw portion or first part is provided with one or more recesses (30ab, 30'ab, 30"ab) and/or one or more elevations (30ac, 30'ac, 30"ac) as in the form of projections for at least permitting two thus coordinated or opposing recesses and/or projections for individual opposing external jaw portions through a movement of rotation around a common axis ((30), (10')) of rotation to form direct clamping surfaces against the workpiece ("A").

5. A chuck-related arrangement in accordance with claim 1, characterized in that each one of the clamping arrangements (3) has its external jaw portion (30) shaped with one or more, between recesses (30ab) and/or elevations (30ac) lying, radially directed elevations (30ac, 30'ab) and/or recesses for letting coordinated and/or opposing elevations and/or recesses each be allotted to an individual clamping arrangement (3, 3') and its external jaw portion (30, 30') for forming in a soft material a direct or an indirect clamping surface against the workpiece ("A").

6. A chuck-related arrangement in accordance with claim 1, characterized in that a peripheral surface (30a) of the respective external jaw portion (30) exhibits a number of at least six recesses (30ab) adapted for permitting rotation of an elevation or projection (30" ac) allotted to an adjacent external or outer jaw portion past one of the recesses of an adjacent external jaw portion.

7. A chuck-related arrangement in accordance with claim 1, characterized in that an elevation or projection (30"ac) allotted to a first external jaw portion (30) is allotted a radial extension from its allotted axis of rotation ((30), (10')) having a radius ("R1") adapted to be somewhat smaller than that of a chosen radius ("R2") for the same recess of a second external jaw portion's side related recess (30ab).

8. A chuck-related arrangement in accordance with claim 1, characterized in that over said blocking or locking unit (4) with its associated locking pin (4*b*, 104"), which is disposed displaceably forward and backward between an activated or a deactivated position for in a first permanent position locking the movement of rotation of the outer jaw portion or second part relative to its allotted base jaw portion or first part and in a second permanent position releasing the movement of rotation relatively to the external jaw portion.

9. A method of mounting a chuck-related arrangement ("a") with at least one basic outer jaw portion (103) as a first part, and a thereto adapted external chuck jaw portion as a second part, and a stopping or locking means according to the following sequences:

a. having said locking means solidly applied to one side of the chuck jaw portion (103), b. attaching the basic chuck jaw portion (104) to a track allotted to the chuck having therein oriented means (10*a*), such as in the form of a T-track nut, with the assistance of a first bolt arrangement (109*b*), c. displacing the external or outer jaw portion (104), with an allotted circular projection (192') having a dovetail cross section, radially along a radially oriented track (191), exposing a similar dovetail configuration in cross section along the basic chuck jaw portion (104) for centering the external jaw portion (103) with regard to its basic jaw portion (104), d. entering a block (92) into the dovetailed radially formed track (191), e. introducing a second bolt arrangement (109*a*) as an axis of rotation for the external jaw portion (103) in relation to the basic jaw portion (104) and/or f. activating said locking means (104") for locking a rotary motion of the external jaw portion relatively to the basic jaw portion for exposing one of several available, fixed clamping surfaces (30*ac*, 30*ab*).

\* \* \* \* \*